(12) United States Patent
Wang et al.

(10) Patent No.: US 11,949,208 B2
(45) Date of Patent: Apr. 2, 2024

(54) DEGASSING-FREE UNDERWATER DISSOLVED CARBON DIOXIDE DETECTION DEVICE AND DETECTION METHOD

(71) Applicant: Ocean University of China, Shandong (CN)

(72) Inventors: Fupeng Wang, Shandong (CN); Rui Liang, Shandong (CN); Qingsheng Xue, Shandong (CN); Jinghua Wu, Shandong (CN); Xijie Hao, Shandong (CN)

(73) Assignee: Ocean University Of China, Shangdon (CN)

(*) Notice: Subject to any disclaimer, the term of this patent is extended or adjusted under 35 U.S.C. 154(b) by 329 days.

(21) Appl. No.: 17/522,978

(22) Filed: Nov. 10, 2021

(65) Prior Publication Data
US 2023/0052245 A1 Feb. 16, 2023

(30) Foreign Application Priority Data
Aug. 10, 2021 (CN) .......................... 202110915210.3

(51) Int. Cl.
*H01S 3/13* (2006.01)
*G01N 15/06* (2006.01)
(Continued)

(52) U.S. Cl.
CPC ............... *H01S 3/13* (2013.01); *G01N 15/06* (2013.01); *H01S 3/0064* (2013.01); *H01S 3/06716* (2013.01); *H01S 3/0675* (2013.01); *H01S 3/094011* (2013.01); *H01S 3/11* (2013.01); *H01S 3/1616* (2013.01); *G01N 2015/0693* (2013.01)

(58) Field of Classification Search
CPC ....... G01N 2015/0693; G01N 21/1702; G01N 21/39; G01N 21/274; G01N 2021/1704; G01N 2021/1708; G01N 15/06; H01S 3/13; H01S 3/06716; H01S 3/1616; H01S 3/11; H01S 3/0675; H01S 3/0064; H01S 3/094011
USPC ...................... 356/432–440; 73/24.01, 24.02
See application file for complete search history.

(56) References Cited

U.S. PATENT DOCUMENTS 8,590,365 B2 * 11/2013 Weppenaar ........... G01M 3/047
73/24.02
11,073,469 B2 * 7/2021 Dong ................. G01N 21/1702

* cited by examiner

*Primary Examiner* — Hoa Q Pham
(74) *Attorney, Agent, or Firm* — Manelli Selter PLLC; Edward Stemberger

(57) ABSTRACT

The present disclosure discloses a degassing-free underwater dissolved carbon dioxide detection device and a detection method. The degassing-free underwater dissolved carbon dioxide detection device includes a computer, which is used to provide the driving signal and controlling parameters for the power tuning unit; the computer is connected with a laser driving control module and the power tuning unit, respectively; the laser driving control module is connected with a laser; the laser is connected with a photo-isolator; the photo-isolator is connected with a thulium-doped fiber vertical-cavity laser system; the thulium-doped fiber vertical-cavity laser system is connected with a photoacoustic cell system through a fiber collimator; the photoacoustic cell system is connected with a pre-amplifier circuit and a lock-in amplifier in sequence, and the lock-in amplifier is connected with the computer.

17 Claims, 3 Drawing Sheets

(51) Int. Cl.
*H01S 3/00* (2006.01)
*H01S 3/067* (2006.01)
*H01S 3/094* (2006.01)
*H01S 3/11* (2023.01)
*H01S 3/16* (2006.01)

DEGASSING-FREE UNDERWATER DISSOLVED CARBON DIOXIDE DETECTION DEVICE AND DETECTION METHOD

CROSS REFERENCE TO RELATED APPLICATION(S)

This patent application claims the benefit and priority of Chinese Patent Application No. 202110915210.3, filed on Aug. 10, 2021, the disclosure of which is incorporated by reference herein in its entirety as part of the present application.

TECHNICAL FIELD

The present disclosure belongs to the technical field of ocean dissolved gas detection, and particularly relates to a degassing-free underwater dissolved carbon dioxide detection device and detection method.

BACKGROUND ART

At present, since the Industrial Revolution, emission of carbon dioxide has been intensified, causing a series of climate-related issues such as global warming, rising sea levels, and frequent extreme weather. Ocean is the largest active carbon reservoir on the earth, which absorbs about 30% of carbon dioxide generated by human activities. The increase of dissolved carbon dioxide in the ocean will bring about ocean acidification, ocean mineral dissolution, oxygen-depleted dead zones, etc. Therefore, developing a technology for detecting dissolved carbon dioxide in the ocean is very important.

At present, the technology for detecting dissolved carbon dioxide in the ocean includes on-site sampling detection, electrochemical detection, optical fiber chemical detection, infrared spectroscopy detection, etc.

The on-site sampling detection method is to collect sea water at different depths and positions below the sea surface. Gas-liquid separation is carried out in a scientific research ship or a laboratory through a headspace balance method, a gas extraction method and a vacuum degassing method, thus obtaining target gas, and the target gas is measured by using a gas chromatographic method, such as "Preliminary study on the characteristics of $CO_2$ and $CH_4$ fluxes at a water-air interface in the backward position of the Jinsha River in summer" by Qin Yu of Chongqing Jiaotong University, "Lake Science", 2017, 29(04):991-999. The method is time consuming and has very complicated operation process, so it does not meet the real-time detection requirement. Furthermore, the concentration of carbon dioxide in the sea water will change with the seasons and environments, and needs to be continuously measured. However, this method is only for measurement at a certain time point, which has limitations. Meanwhile, sample gas escape is easily caused in the analysis process, causing deviations in detection results.

The electrochemical detection method and the optical fiber chemical detection method are both to measure the concentration of the carbon dioxide based on measuring changes in PH values of the sea water. In the electrochemical detection method, an ion permselective membrane is added to a measurement electrode, and its potential has a linear relationship with the concentration of specific ions. Calculating a concentration value of dissolved carbon dioxide in the sea water by means of a potential difference between the measurement electrode and a reference electrode, such as dissolved oxygen Clark cell integrated in an SBE sensor of Sea-Bird Company in the United States, is based on electrochemical principles. In the optical fiber chemical detection method, ionic and free carbon dioxide in the sea water is firstly conveyed through the ion permselective membrane into the sensor; an internal PH indicator reagent then changes, causing a sensitive reagent to emit fluorescent light; the fluorescent light is then transmitted to a photoelectric detector through an optical fiber; and the concentration of the carbon dioxide is calculated. For example, a SAMI-$CO_2$ sensor developed by the Sunburst Sensors company in the United States is used. The above-mentioned measurement methods have low degassing efficiency and sample gas loss, which affects the accuracy of the detection results.

The infrared spectroscopy detection method excites, by infrared light, the energy level transition of gas molecules to be measured, so that the energy of the infrared light is stored in the gas molecules. When the gas to be measured is irradiated by laser, radiation of a specific wavelength is absorbed by the gas to be measured and an absorption peak is generated. The Beer-Lambert law shows that the absorption peak intensity of the gas is directly proportional to its concentration. By measuring a wavelength and the absorption peak intensity of light corresponding to the gas, the type and concentration of the gas can be measured, for example, the patent No. CN201710285100.7, entitled "Carbon dioxide gas detection system based on infrared spectral absorption principle" written by Chen Gennan. In addition, spectroscopic gas sensing methods also include Raman spectroscopy technology, differential absorption spectroscopy technology, attenuated total reflection technology, surface plasmon resonance technology, and tunable diode laser absorption spectroscopy technology (TDLAS). The TDLAS technology has the advantages of high environmental adaptability, high sensitivity, no sample gas consumption, etc. However, degassing still needs to be carried out in actual application, and then gas detection is performed. There are problems of low degassing efficiency, low response speed, etc.; and secondly, if the detection sensitivity needs to be improved, a multi-reflection long optical path absorption cell design needs to be used, which leads to an increase in the volume of an absorption cell and requires more gas to be collected. At present, there is an irreconcilable contradiction between response time and improvement of measurement sensitivity under this solution.

Through the above analysis, common problems and defects existing in the existing art are: degassing first and then measurement. Especially for the current more reliable TDLAS detection technology, in order to improve the measurement sensitivity, a large amount of gas needs to be removed from the sea water to fill the long optical path absorption cell, which greatly prolongs the measurement time of the system. The long degassing time will bring a series of negative effects, such as reducing the temporal-spatial resolution of sea water measurement, and reducing the measurement accuracy.

The difficulty in solving the above problems and deficiencies: There is no advanced technology currently that can support degassing-free measurement for dissolved gases in the sea water. An infrared light source used in the TDLAS technology has extremely high transmission loss in the sea water and short transmission distance, which will inevitably lead to that the accuracy and the stability are hard to ensure when this technology is directly used in water. However, other traditional methods such as electrochemistry are limited by reaction mechanisms, so sensitive probes cannot be in direct contact with the sea water.

The significance of solving the above problems and deficiencies is that the present disclosure provides a degassing-free underwater dissolved gas detection solution based on photoacoustic spectroscopy, which solves the difficulties of "degassing first and then measurement" in this art, and eliminates the degassing process. Direct detection of the dissolved gas in water greatly improves the response speed of the system, and the original problems of low measurement accuracy, difficulty in inversion of gas concentration, etc. caused by the long degassing time are also greatly alleviated. In addition, the present invention also uses technical strategy such as a thulium-doped fiber laser light source, power tuning, Q-switched pulse outputting, etc., which can greatly improve the measurement sensitivity.

SUMMARY

In terms of the problems in the existing art, the present disclosure provides a degassing-free underwater dissolved carbon dioxide detection device and a detection method.

The present disclosure is realized as follows. A degassing-free underwater dissolved carbon dioxide detection device is provided with a computer used to provide a power tuning driving signal for a power tuning unit and control the power tuning unit to tune a parameter;

the computer is connected with a laser device driving control module and the power tuning unit, respectively; the laser device driving control module is connected with a 2004 nm laser device; the 2004 nm laser device is connected with a photo-isolator;

the photo-isolator is connected with a thulium-doped fiber vertical-cavity laser device light source system; the thulium-doped fiber vertical-cavity laser device light source system is connected with a photoacoustic cell system through a fiber collimator;

the photoacoustic cell system is connected with a pre-amplifier circuit and a phase-locked amplifier in sequence, and the phase-locked amplifier is connected with the computer.

Further, the power tuning unit may use one of a photo-switch, an electrooptical modulator and an acousto-optic modulator; and the power tuning unit is used to periodically modulate intracavity loss and perform power tuning and Q-switched pulse outputting.

Further, the thulium-doped fiber vertical-cavity laser device light source system is formed by connecting a high-reflection (HR) grating, a power tuning unit, a first 793 nm pump laser device, a first wavelength division multiplexer, a thulium-doped fiber, a second wavelength division multiplexer, a second 793 nm pump laser device, a low-reflection (LR) grating in sequence;

the HR grating and the LR grating form a resonator cavity of the thulium-doped fiber vertical-cavity laser device light source system; the resonator cavity outputs laser from one end of the LR grating;

the first 793 nm pump laser device, the second 793 nm pump laser device, the first wavelength division multiplexer, and the second wavelength division multiplexer are used to perform bidirectional pumping on the thulium-doped fiber.

Further, the thulium-doped fiber is used to increase output power of laser with a wavelength of 2004 nm.

Further, the first 793 nm pump laser device and the second 793 nm pump laser device may also respectively perform unidirectional pumping on the thulium-doped fiber;

the wavelength division multiplexer and the second wavelength division multiplexer may also cooperate with the first 793 nm pump laser device and the second 793 nm pump laser device respectively to perform the unidirectional pumping on the thulium-doped fiber.

Further, the photoacoustic cell system is provided with a filter, a pressure relief valve, a flow valve, a water inlet, a microphone, a water outlet, a focusing lens, and a pressurized draining pump in sequence;

the filter, the pressure relief valve, and the flow valve are respectively used to realize filtering, pressure relief, flow stabilization and volume fixing for sea water.

Further, the microphone is fixedly connected with the inner wall of the photoacoustic cell system and is kept in an orthogonality relation with the focusing lens to collect and convert a sound wave signal;

an outer wall of the photoacoustic cell system is wrapped with a sound absorption material to relieve interference of environmental noise.

Further, the fiber collimator is connected with the focusing lens and is used to collimate and focus incident light; and the phase-locked amplifier is used to extract a weak signal from environmental noise.

Another aim of the present disclosure is to provide a degassing-free underwater dissolved carbon dioxide detection method applied to the degassing-free underwater dissolved carbon dioxide detection device. The degassing-free underwater dissolved carbon dioxide detection method includes:

step I, the computer controlling the laser device driving control module to input a driving signal to the 2004 nm laser device and driving the 2004 nm laser device to emit laser, and injecting the emitted laser serving as a seed source into a cavity of a thulium-doped fiber vertical-cavity laser device after the laser passes through the photo-isolator;

step II, the HR grating and the LR grating forming the resonator cavity of the thulium-doped fiber vertical-cavity laser device, and the computer inputting the driving signal to the power tuning unit to periodically tune intracavity loss to realize power turning and Q-switched pulse outputting;

step III, the first 793 nm pump laser device and the second 793 nm pump laser device performing bidirectional pumping on the thulium-doped fiber through the first wavelength division multiplexer and the second wavelength division multiplexer, and outputting laser from one end of the LR grating;

step IV, performing filtering, pressure relief, flow stabilization and volume fixing on sea water through the filter, the pressure relief valve and the flow valve in sequence, putting the sea water into a cell through a water inlet, and draining the sea water by the pressurized draining pump through a water outlet;

step V, the laser entering the photoacoustic cell system through the fiber collimator, converging the laser to one position through the focusing lens to stimulate the sea water to be measured, and carbon dioxide in the sea water absorbing light energy with a specific wavelength 2004 nm to generate a photoacoustic signal;

step VI, the microphone generating a current signal after detecting the photoacoustic signal and sending the current signal to the pre-amplifier circuit for current-voltage conversion, transmitting an output voltage signal to the computer for calculation after the voltage signal passes through the phase-locked amplifier, and performing inversion to obtain a concentration value of dissolved carbon dioxide in the sea water to be measured.

The present disclosure provides a computer program medium stored on a computer-readable medium. The computer program medium includes a computer-readable program which, when executed on an electronic device, provides a user input interface to implement the degassing-free underwater dissolved carbon dioxide detection method.

In combination with all the above technical solutions, the present disclosure has the advantages and active effects below. The present disclosure provides a degassing-free underwater dissolved carbon dioxide detection device. By the adoption of the photoacoustic spectroscopy technology, the filter, the pressure relief valve and the flow valve are connected to realize impurity filtering, pressure relief and flow stabilization for the sea water. Only a small amount of water is needed in a photoacoustic stimulation process to realize degassing-free detection, so that the response time is greatly shortened. By means of the design of the fiber collimator, the photoacoustic cell system, the pre-amplifier circuit and the phase-locked amplifier, a focused light path stimulates sound waves; and meanwhile, the interference of the environmental noise is greatly suppressed, the use environment of the system is expanded, and bright-field detection is realized. By means of the design of the computer, the power tuning unit, and the laser device light source system, intensity modulation and Q-switched pulse outputting are realized to stimulate a photoacoustic signal, so that the line width and the pulse width of the output laser are the best, the absorption coupling efficiency is improved, and a stronger photoacoustic signal is stimulated, thus improving the system response speed and the detection sensitivity. The degassing-free measurement method for dissolved gas in water is provided for the first time in the present disclosure, and feasible solutions are provided. The solutions of the present disclosure have been unanimously recognized by experts in the art and supported by several projects such as National Natural Science Foundation of China. The present disclosure has extremely high creativity and good application prospect.

The present disclosure adopts the photoacoustic spectroscopy technology. The filter, the pressure relief valve and the flow valve are connected to realize impurity filtering, pressure relief, flow stabilization and volume fixing for the sea water, thus ensuring the stability of a photoacoustic stimulation environment in the sea water. Only a small amount of water is needed in the photoacoustic stimulation process, so a contact path between an excitation light beam and the sea water is very short, which effectively avoids strong absorption of infrared light by the sea water and realizes degassing-free detection.

According to the present disclosure, the fiber collimator and the focusing lens converge the output laser at one point to stimulate the sea water to be measured. The carbon dioxide in the sea water absorbs the light energy with the specific wavelength of 2004 nm to generate the photoacoustic signal. The microphone generates the current signal after detecting the sound wave signal and sends the current signal to the pre-amplifier circuit, and the current signal passes through the phase-locked amplifier to eliminate the interference of sound signals at a spurious frequency, thus realizing the bright-field detection.

The present disclosure uses a special intensity-modulated photoacoustic spectroscopy working mode. The computer controls the power tuning unit to enable the thulium-doped fiber direct cavity laser device light source system to generate Q-switched pulse outputting. Compared with a continuous light output mode of an ordinary semiconductor laser device, the special intensity-modulated photoacoustic spectroscopy working mode has a higher peak power and can stimulate stronger photoacoustic signals. In addition, by optimizing the pumping power, a tuning duty ratio and other system parameters, the line width and the pulse width of the laser output by a Q-switched pulse are the best, and the efficiency of coupling with an absorption line is improved. It is also favorable for stimulating stronger photoacoustic signals, thereby improving the system response speed and the detection sensitivity.

Figure 1:
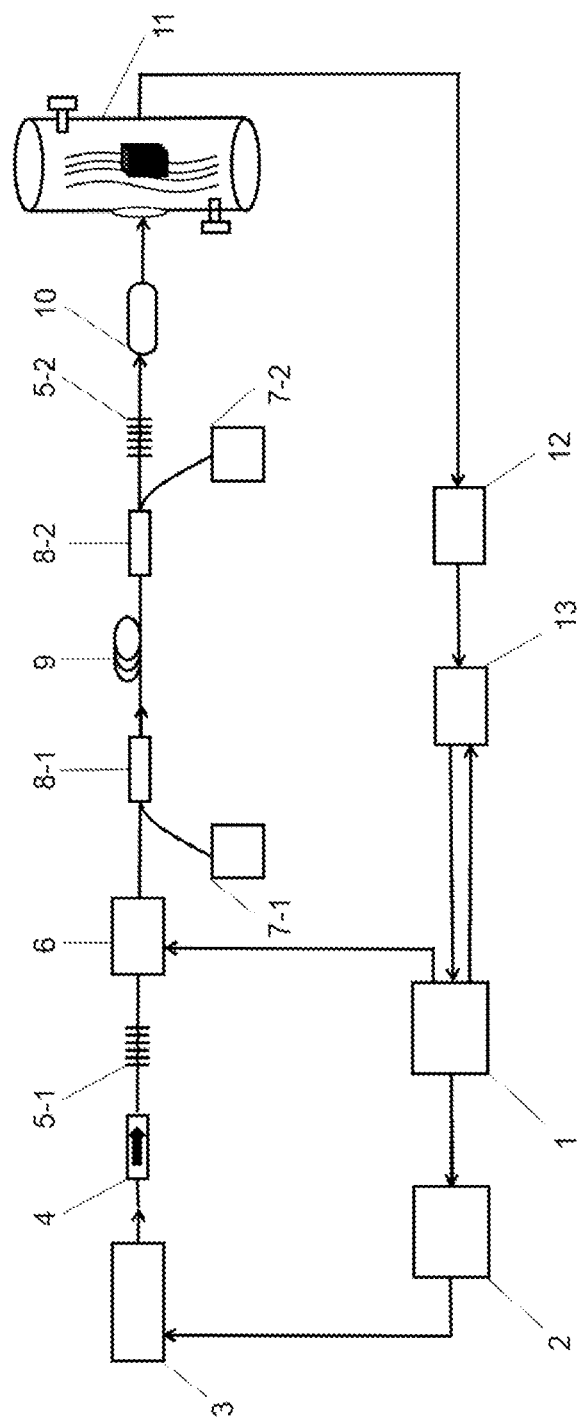
FIG. 1 is a schematic structural diagram of a degassing-free underwater dissolved carbon dioxide detection device provided by the embodiments of the present disclosure.

Reference signs in the drawings: 1: computer; 2: laser device driving control module; 3: 2004 nm laser device; 4: photo-isolator; 5-1: high-reflection (HR) grating; 5-2: low-reflection (LR) grating; 6: power tuning unit; 7-1: first 793 nm pump laser device; 7-2: second 793 nm pump laser device; 8-1: first wavelength division multiplexer; 8-2: second wavelength division multiplexer; 9: thulium-doped fiber; 10: fiber collimator; 11: photoacoustic cell system; 11-1: filter; 11-2: pressure relief valve; 11-3: flow valve; 11-4: water inlet; 11-5: microphone; 11-6: water outlet; 11-7: focusing lens; 11-8: pressurized draining pump; 12: pre-amplifier circuit; 13: phase-locked amplifier.

DETAILED DESCRIPTION OF THE EMBODIMENTS

In order to make the objectives, technical solutions and advantages of the present disclosure clearer, the present disclosure is further described below in detail in combination with the embodiments. It should be understood that the specific embodiments described here are merely to explain the present disclosure, and not intended to limit the present disclosure.

In terms of the problems in the existing art, the present disclosure provides a degassing-free underwater dissolved carbon dioxide detection device and a detection method. The present disclosure is described in detail below in combination with the accompanying drawings.

Figure 2:
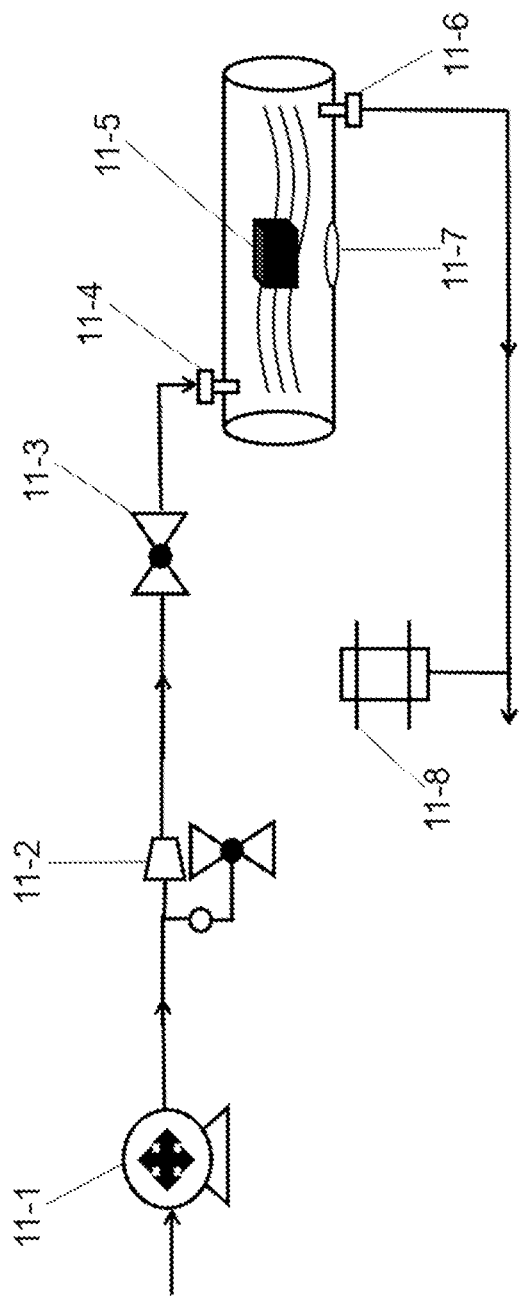
FIG. 2 is a schematic structural diagram of a photoacoustic cell system provided by the embodiments of the present disclosure.

As shown in FIG. 1 to FIG. 2, a degassing-free underwater dissolved carbon dioxide detection device provided by the embodiments of the present disclosure is provided with a computer 1 used to provide a power tuning driving signal for a power tuning unit and control the power tuning unit to tune a parameter;

the computer 1 is connected with a laser device driving control module 2 and the power tuning unit 6, respectively; the laser device driving control module 2 is connected with a 2004 nm laser device 3; and the 2004 nm laser device 3 is connected with a photo-isolator 4;

the photo-isolator 4 is connected with a thulium-doped fiber vertical-cavity laser device light source system; the thulium-doped fiber vertical-cavity laser device light source system is connected with a photoacoustic cell system 11 through a fiber collimator 10;

the photoacoustic cell system 11 is connected with a pre-amplifier circuit 12 and a phase-locked amplifier 13 in sequence, and the phase-locked amplifier 13 is connected with the computer 1.

The power tuning unit 6 provided by the embodiments of the present disclosure may use one of a photoswitch, an electrooptical modulator and an acousto-optic modulator; and the power tuning unit 6 is used to periodically modulate intracavity loss and perform power tuning and Q-switched pulse outputting.

The thulium-doped fiber vertical-cavity laser device light source system provided by the embodiments of the present disclosure is formed by connecting a high-reflection (HR) grating 5-1, a power tuning unit 6, a first 793 nm pump laser device 7-1, a first wavelength division multiplexer 8-1, a thulium-doped fiber 9, a second wavelength division multiplexer 8-2, a second 793 nm pump laser device 7-2, a low-reflection (LR) grating 5-2 in sequence.

The HR grating 5-1 and the LR grating 5-2 form a resonator cavity of the thulium-doped fiber vertical-cavity laser device light source system; the resonator cavity outputs laser from one end of the LR grating 5-2.

The photoacoustic cell system 11 provided by the embodiments of the present disclosure is provided with a filter 11-1, a pressure relief valve 11-2, a flow valve 11-3, a water inlet 11-4, a microphone 11-5, a water outlet 11-6, a focusing lens 11-7, and a pressurized draining pump 11-8 in sequence.

The microphone 11-5 provided by the embodiments of the present disclosure is fixedly connected with the inner wall of the photoacoustic cell system 11 and is kept in an orthogonality relation with the focusing lens 11-7 to collect and convert a sound wave signal.

The size of a photoacoustic cell provided by the embodiments of the present disclosure shall satisfy:

$$L = \frac{2n-1}{2}\lambda, n = 1, 2, 3 \ldots$$
$$R = \frac{2n-1}{4}\lambda, n = 1, 2, 3 \ldots$$

where L is a length of the photoacoustic cell, R is a radius of the photoacoustic cell, and $\lambda$ is a wavelength of a sound wave. In order to avoid sound wave loss, n shall be between 2 and 10, thus achieving a sound wave resonance enhancement effect.

An outer wall of the photoacoustic cell system provided by the embodiments of the present disclosure is wrapped with a sound absorption material to relieve interference of environmental noise.

The fiber collimator 10 provided by the embodiments of the present disclosure is connected with the focusing lens 11-7 and is used to collimate and focus incident light.

The phase-locked amplifier 13 provided by the embodiments of the present disclosure is used to extract a weak signal from the environmental noise.

Figure 3:
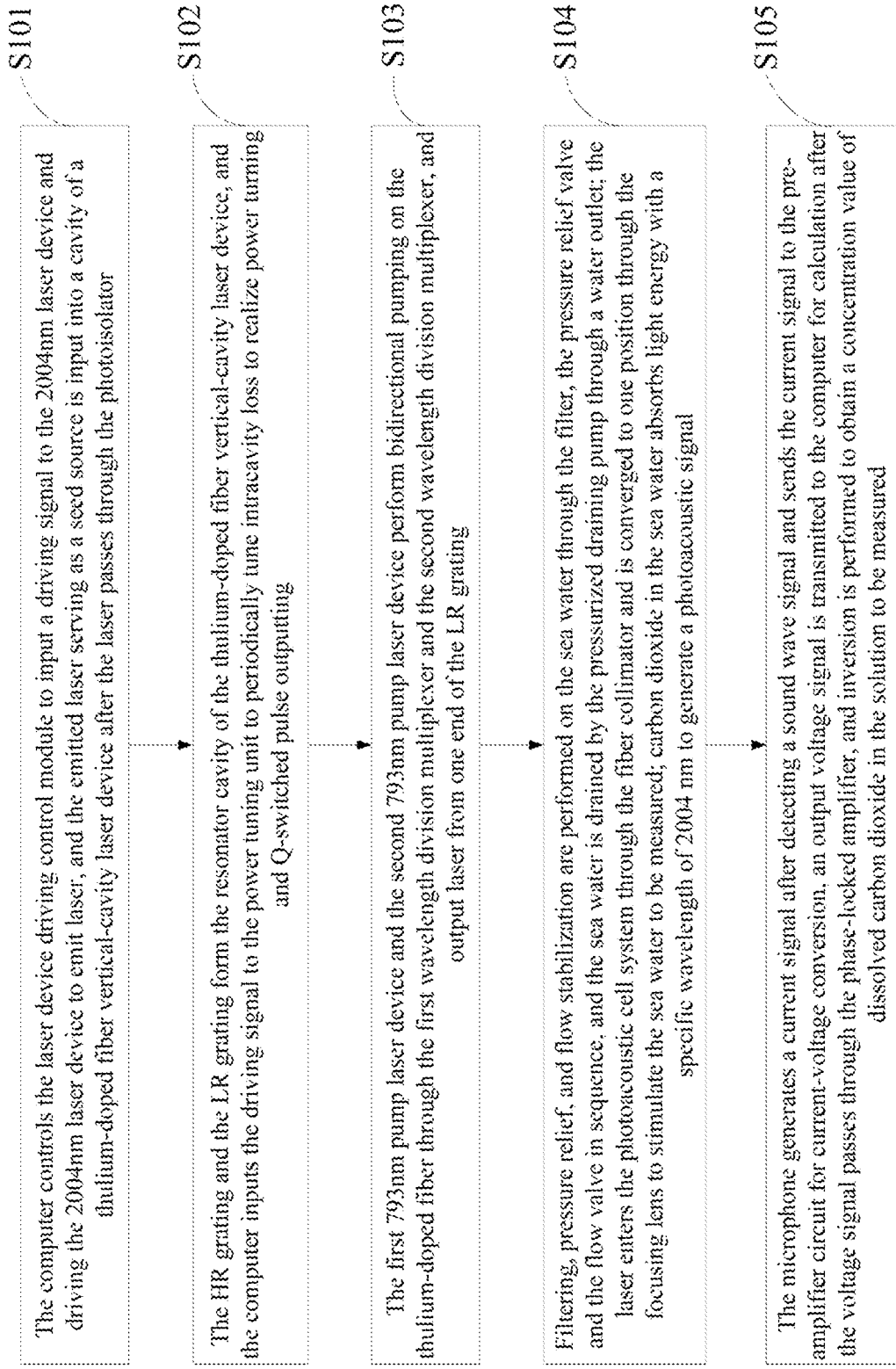
FIG. 3 is a flow chart of a degassing-free underwater dissolved carbon dioxide detection method provided by the embodiments of the present disclosure.

As shown in FIG. 3, a degassing-free underwater dissolved carbon dioxide detection method provided by the embodiments of the present disclosure includes the following steps.

S101, the computer controls the laser device driving control module to input a driving signal to the 2004 nm laser device and driving the 2004 nm laser device to emit laser, and injecting the emitted laser serving as a seed source into a cavity of a thulium-doped fiber vertical-cavity laser device after the laser passes through the photo-isolator;

S102, the HR grating and the LR grating form the resonator cavity of the thulium-doped fiber vertical-cavity laser device, and the computer inputs the driving signal to the power tuning unit to periodically tune intracavity loss to realize power turning and Q-switched pulse outputting;

S103, the first 793 nm pump laser device and the second 793 nm pump laser device perform bidirectional pumping on the thulium-doped fiber through the first wavelength division multiplexer and the second wavelength division multiplexer, and output laser from one end of the LR grating;

S104, the sea water passes through the filter, the pressure relief valve and the flow valve in sequence for filtering, pressure relief and flow stabilization, then enters the cell through a water inlet, and is drained by the pressurized draining pump through a water outlet; the laser enters the photoacoustic cell system via the fiber collimator, and is converged at one position through the focusing lens to stimulate the sea water to be measured; and the carbon dioxide in the sea water absorbs light energy with a specific wavelength of 2004 nm to generate a photoacoustic signal;

S105, the microphone generates a current signal after detecting a sound wave signal and sends the current signal to the pre-amplifier circuit for current-voltage conversion; an output voltage signal is transmitted to the computer for calculation after the voltage signal passes through the phase-locked amplifier; and inversion is performed to obtain a concentration value of dissolved carbon dioxide in the sea water to be measured. 1: computer; 2: laser device driving control module; 3: 2004 nm laser device; 4: photo-isolator; 5-1: high-reflection (HR) grating; 5-2: low-reflection (LR) grating; 6: power tuning unit; 7-1: first 793 nm pump laser device; 7-2: second 793 nm pump laser device; 8-1: first wavelength division multiplexer; 8-2: second wavelength division multiplexer; 9: thulium-doped fiber; 10: fiber collimator; 11: photoacoustic cell system; 11-1: filter; 11-2: pressure relief valve; 11-3: flow valve; 11-4: water inlet; 11-5: microphone; 11-6: water outlet; 11-7: focusing lens; 11-8: pressurized draining pump; 12: pre-amplifier circuit; 13: phase-locked amplifier.

Embodiment 1

The present disclosure provides a degassing-free underwater dissolved carbon dioxide detection device. A computer 1 is connected with a laser device driving control module 2 and a power tuning unit, respectively; the laser device driving control module 2 is connected with a 2004 nm laser device 3; and the 2004 nm laser device 3 is connected with a photo-isolator; an HR grating, the power tuning unit, a first 793 nm pump laser device 7-1, a first wavelength division multiplexer 8-1, a thulium-doped fiber, a second wavelength division multiplexer 8-2, a second 793 nm pump laser device 7-2, an LR grating 5-2 are connected in sequence to form a thulium-doped fiber vertical-cavity laser device light source system; the thulium-doped fiber vertical-cavity laser device light source system is connected with a photoacoustic cell system through a fiber collimator; the photoacoustic cell system is provided with a filter 11-1, a pressure relief valve 11-2, a flow valve 11-3, a water inlet 11-4, a microphone 11-5, a water outlet 11-6, a focusing lens 11-7, and a pressurized draining pump 11-8 in sequence; the photoacoustic cell system is connected with a pre-amplifier circuit 12 and a phase-locked amplifier 13 in sequence; and the phase-locked amplifier 13 is connected with the computer 1.

A degassing-free underwater dissolved carbon dioxide detection method provided by the embodiments of the present disclosure includes the following steps.

At a first step, the computer 1 controls the laser device driving control module 2 to input a driving signal to the 2004 nm laser device 3 and drives the laser device to emit light, and the laser serving as a seed source is injected into a cavity of a thulium-doped fiber vertical-cavity laser device after the laser passes through the photo-isolator;

at a second step, the HR grating and the LR grating form the resonator cavity of the thulium-doped fiber vertical-cavity laser device, and the computer 1 inputs the driving signal to the power tuning unit to periodically tune intracavity loss to realize power turning and Q-switched pulse outputting;

at a third step, the first 793 nm pump laser device 7-1 and the second 793 nm pump laser device 7-2 perform bidirectional pumping on the thulium-doped fiber through the first wavelength division multiplexer 8-1 and the second wavelength division multiplexer 8-2, and output laser from one end of the LR grating 5-2;

at a fourth step, the sea water passes through the filter, the pressure relief valve and the flow valve and then enters the cell through a water inlet to realize impurity filtering, pressure relief and flow stabilization of the sea water, and is drained by the pressurized draining pump through a water outlet, so as to ensure the stability of a photoacoustic stimulation environment of the sea water; the laser enters the photoacoustic cell system via the fiber collimator, and is converged at one position through the focusing lens to stimulate the sea water to be measured; and the carbon dioxide in the sea water absorbs light energy with a specific wavelength of 2004 nm to generate a photoacoustic signal;

at a fifth step, the microphone generates a current signal after detecting a sound wave signal and sends the current signal to the pre-amplifier circuit for current-voltage conversion; an output voltage signal is transmitted to the computer 1 for calculation after the voltage signal passes through the phase-locked amplifier; and inversion is performed to obtain a concentration value of dissolved carbon dioxide in the sea water to be measured.

According to one preferred embodiment of the present disclosure, a photo-isolator is arranged between the 2004 nm laser device 3 and the thulium-doped fiber vertical-cavity laser device light source system, so as to prevent backward-reflected light of the thulium-doped fiber vertical-cavity laser device from entering the 2004 nm laser device 3 and interfering the output characteristics.

According to one preferred embodiment of the present disclosure, the power tuning unit may use one of a photo-switch, an electrooptical modulator and an acousto-optic modulator to periodically modulate intracavity loss to realize power tuning and Q-switched pulse outputting. The computer 1 provides a power tuning driving signal for the power tuning unit and controls a tuning frequency and a tuning duty ratio of the power tuning unit to make the line width and the pulse width of the output laser best, thus improving the absorption coupling efficiency and stimulating stronger photoacoustic signals.

According to one preferred embodiment of the present disclosure, the resonator cavity of the thulium-doped fiber vertical-cavity laser device light source system is composed of the HR grating and the LR grating 5-2, and laser outputting is realized at one end of the LR grating 5-2.

According to one preferred embodiment of the present disclosure, the first 793 nm pump laser device 7-1, the second 793 nm pump laser device 7-2, the first wavelength division multiplexer 8-1 and the second wavelength division multiplexer 8-2 are arranged in the thulium-doped fiber vertical-cavity laser device light source system to perform bidirectional pumping on the thulium-doped fiber, or one group of pump laser device and wavelength division multiplexer can be used alone to perform unidirectional pumping on the thulium-doped fiber.

According to one preferred embodiment of the present disclosure, the thulium-doped fiber is arranged in the thulium-doped fiber vertical-cavity laser device light source system, so that the output power of the laser with the wavelength of 2004 nm can be improved, and the carbon dioxide detection capacity is improved.

According to one preferred embodiment of the present disclosure, the photoacoustic cell system is provided with the filter, the pressure relief valve, the flow valve, the water inlet, the microphone, the water outlet, the focusing lens, and the pressurized draining pump in sequence.

The sea water passes through the filter, the pressure relief valve and the flow valve and then enters the cell through a water inlet to realize impurity filtering, pressure relief and flow stabilization of the sea water, and is drained by the pressurized draining pump through a water outlet, so as to ensure the stability of a photoacoustic stimulation environment of the sea water;

the microphone is fixedly connected with the inner wall of the photoacoustic cell system and is kept in an orthogonality relation with the focusing lens to avoid laser incidence energy from interfering the microphone and realize collection and conversion of a sound wave signal;

an outer wall of the photoacoustic cell system is wrapped with a sound absorption material, which can relieve the interference of the environmental noise.

According to one preferred embodiment of the present disclosure, the fiber collimator is connected with the focusing lens to realize collimation and focusing of the incident light.

According to one preferred embodiment of the present disclosure, the phase-locked amplifier is arranged between the pre-amplifier circuit and the computer 1, so that the weak signal can be extracted from the environmental noise, and the signal-to-noise ratio can be increased.

Specifically, a working method of the above degassing-free underwater dissolved carbon dioxide detection device includes the following steps.

The computer controls the laser device driving control module 2 to input a driving signal to the 2004 nm laser device 3 and drive the laser device to emit light, and the light serving as a seed source is injected into a cavity of a thulium-doped fiber vertical-cavity laser device after the light passes through the photo-isolator;

the HR grating and the LR grating form the resonator cavity of the thulium-doped fiber vertical-cavity laser device, and the computer 1 inputs the driving signal to the power tuning unit to periodically tune intracavity loss to realize power turning and Q-switched pulse outputting;

the first 793 nm pump laser device 7-1 and the second 793 nm pump laser device 7-2 perform bidirectional pumping on the thulium-doped fiber through the first wavelength division multiplexer 8-1 and the second wavelength division multiplexer 8-2, and output laser from one end of the LR grating 5-2;

the sea water passes through the filter, the pressure relief valve and the flow valve and then enters the cell through a water inlet to realize impurity filtering, pressure relief and flow stabilization of the sea water, and is drained by the pressurized draining pump through a water outlet, so as to ensure the stability of a photoacoustic stimulation environment of the sea water;

the laser enters the photoacoustic cell system via the fiber collimator and is converged at one position through the focusing lens to stimulate the sea water to be measured; the carbon dioxide in the sea water absorbs the light energy with a specific wavelength of 2004 nm to generate a photoacoustic signal; sound waves generated by the photoacoustic signal are totally reflected in the absorption cell, and the propagation velocity and frequency are the same; incident sound waves and reflected sound waves which have opposite directions form standing waves after being superposed; meanwhile, the sound waves can be propagated in all directions; and the multi-directional standing waves make the resonance effect more obvious.

In order to achieve the resonance enhancement effect, the size of the photoacoustic cell shall satisfy:

$$L = \frac{2n-1}{2}\lambda, n = 1, 2, 3 \ldots$$
$$R = \frac{2n-1}{4}\lambda, n = 1, 2, 3 \ldots$$

where L is a length of the photoacoustic cell, R is a radius of the photoacoustic cell, and λ is a wavelength of a sound wave. In order to avoid sound wave loss, n shall be between 2 and 10.

The microphone generates a current signal after detecting a sound wave signal and sends the current signal to the pre-amplifier circuit for current-voltage conversion; a voltage signal output by the pre-amplifier circuit is transmitted to the computer for calculation after the voltage signal passes through the phase-locked amplifier; and inversion is performed to obtain a concentration value of dissolved carbon dioxide in a seawater to be measured.

Embodiment 2

The present embodiment is a further description made for Embodiment 1 of the present disclosure.

A photo-isolator 4 is arranged between the 2004 nm laser device 3 and the thulium-doped fiber vertical-cavity laser device light source system, so as to prevent backward-reflected light of the thulium-doped fiber vertical-cavity laser device from entering the 2004 nm laser device 3 and interfering the output characteristics.

The power tuning unit 6 may use one of a photoswitch, an electrooptical modulator and an acousto-optic modulator to periodically modulate intracavity loss to realize power tuning and Q-switched pulse outputting. The computer 1 provides a power tuning driving signal for the power tuning unit 6 and controls a tuning frequency of the power tuning unit to make the line width and the pulse width of the output laser best, thus improving the absorption coupling efficiency and stimulating stronger photoacoustic signals.

Embodiment 3

The present embodiment is a further description made for Embodiment 1.

The resonator cavity of the thulium-doped fiber vertical-cavity laser device light source system is composed of the HR grating 5-1 and the LR grating 5-2, and laser outputting is realized at one end of the LR grating 5-2.

The first 793 nm pump laser device 7-1, the second 793 nm pump laser device 7-2, the first wavelength division multiplexer 8-1 and the second wavelength division multiplexer 8-2 are arranged in the thulium-doped fiber vertical-cavity laser device light source system to perform bidirectional pumping on the thulium-doped fiber, or one group of pump laser device and wavelength division multiplexer can be used alone to perform unidirectional pumping on the thulium-doped fiber.

The thulium-doped fiber 9 is arranged in the thulium-doped fiber vertical-cavity laser device light source system.

Embodiment 4

The present embodiment is a further description made for Embodiment 1.

The photoacoustic cell system 11 is provided with a filter 11-1, a pressure relief valve 11-2, a flow valve 11-3, a water inlet 11-4, a microphone 11-5, a water outlet 11-6, a focusing lens 11-7, and a pressurized draining pump 11-8. The sea water passes through the filter 11-1, the pressure relief valve 11-2 and the flow valve 11-3 and then enters the cell through the water inlet 11-4 to realize impurity filtering, pressure relief and flow stabilization of the sea water, and is drained by the pressurized draining pump 11-8 through the water outlet 11-6, so as to ensure the stability of a photoacoustic stimulation environment of the sea water;

the microphone 11-5 is fixedly connected with the inner wall of the photoacoustic cell system 11 and is kept in an orthogonality relation with the focusing lens 11-7 to avoid laser incidence from interfering the microphone 11-5 and realize collection and conversion of a sound wave signal;

an outer wall of the photoacoustic cell system 11 is wrapped with a sound absorption material, which can relieve the interference of the environmental noise.

Embodiment 5

The present embodiment is a further description made for Embodiment 1.

The fiber collimator 10 is connected with the focusing lens 11-7 and is used to collimate and focus incident light.

A phase-locked amplifier 13 is arranged between the pre-amplifier circuit 12 and the computer 1, so that a weak signal can be extracted from the environmental noise, which improves the signal quality and realize bright-field detection.

Embodiment 6

A working method of the degassing-free underwater dissolved carbon dioxide detection device provided according to Embodiments 1-5 includes the following steps.

(1) The computer 1 controls the laser device driving control module 22 to input a driving signal to the 2004 nm laser device 3 and drive the laser device to emit light, and the light serving as a seed source is injected into a cavity of a thulium-doped fiber vertical-cavity laser device after the light passes through the photo-isolator 4;

(2) the HR grating 5-1 and the LR grating 5-2 form the resonator cavity of the thulium-doped fiber vertical-cavity laser device, and the computer 1 inputs the driving signal to the power tuning unit 6 to periodically tune intracavity loss to realize power turning and Q-switched pulse outputting;

(3) the first 793 nm pump laser device 7-1 and the second 793 nm pump laser device 7-2 perform bidirectional pumping on the thulium-doped fiber 9 through the first wavelength division multiplexer 8-1 and the second wavelength division multiplexer 8-2, and output laser from one end of the LR grating 5-2;

(4) the sea water passes through the filter 11-1, the pressure relief valve 11-2 and the flow valve 11-3, then enters the cell through the water inlet 11-4 to realize impurity filtering, pressure relief and flow stabilization of the sea water, so as to ensure the stability of a photoacoustic stimulation environment of the sea water, and is drained by the pressurized draining pump 11-8 through the water outlet 11-6;

(5) the laser enters the photoacoustic cell system 11 via the fiber collimator 10, and the output laser is converged at one position through the focusing lens 11-7 to stimulate the sea water to be stimulated to generate sound waves; the microphone 11-5 generates a current signal after detecting a sound wave signal and transmits the current signal to the pre-amplifier circuit 12; and (6) the current signal output by the pre-amplifier circuit 12 is transmitted to the computer for calculation after passing through the phase-locked amplifier 13, thus performing inversion to obtain a concentration value of dissolved carbon dioxide of a seawater to be measured.

Embodiment 7

According to the degassing-free underwater dissolved carbon dioxide detection device provided according to Embodiment 1, a difference lies in that:

the wavelength of the pump laser device in the thulium-doped fiber vertical-cavity laser device light source system is not only limited to 793 nm, and other wavelengths in a thulium ion absorption spectrum can be used, such as 1550 nm.

Embodiment 8

According to the degassing-free underwater dissolved carbon dioxide detection device provided according to Embodiment 1, a difference lies in that:

a sound wave signal acquisition device is not only limited to the microphone, and other sound transducer devices can be used.

Embodiment 9

According to the degassing-free underwater dissolved carbon dioxide detection device provided according to Embodiment 1, a difference lies in that:

the microphone in the photoacoustic cell system is not only limited to a square shape, and a ringlike microphone can be used.

Embodiment 10

According to the degassing-free underwater dissolved carbon dioxide detection device provided according to Embodiment 1, a difference lies in that:

The photoacoustic cell system is not only limited to a cylindrical shape, and a dumbbell shape can be used.

In the description of the present disclosure, unless otherwise stated, "plurality" means two or more. Orientations or positional relationships indicated by the terms "upper", "lower", "left", "right", "inside", "outside", "front end", "rear end", "head", "tail" and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms are construed as limiting the present disclosure. In addition, the terms "first", "second", "third", etc. are only for the purpose of description, and may not be understood as indicating or implying the relative importance.

The above descriptions are only specific implementation modes of the present disclosure, but the scope of protection of the present disclosure is not limited thereto. For any person skilled in the art, within the technical scope disclosed by the present disclosure, any modifications, equivalent substitutions, improvements, etc. made within the spirit and principle of the present disclosure shall all fall within the scope of protection of the present disclosure.

What is claimed is:

1. A degassing-free underwater dissolved carbon dioxide detection device, comprising:
    a power tuning unit;
    a laser device;
    a laser device driving control module connected with the laser device;
    a photo-isolator connected with the laser device;
    a thulium-doped fiber vertical-cavity laser device light source system;
    a photoacoustic cell system;
    a pre-amplifier circuit;
    a phase-locked amplifier; and
    a computer constructed and arranged to provide a power tuning driving signal for the power tuning unit and to control the power tuning unit to tune a parameter, the computer being connected with the laser device driving control module and the power tuning unit, respectively,
    wherein the photo-isolator is connected with the thulium-doped fiber vertical-cavity laser device light source system; the thulium-doped fiber vertical-cavity laser device light source system is connected with the photoacoustic cell system through a fiber collimator, and
    wherein the photoacoustic cell system is connected with the pre-amplifier circuit and the phase-locked amplifier in sequence, and the phase-locked amplifier is connected with the computer.

2. The degassing-free underwater dissolved carbon dioxide detection device according to claim 1, wherein the power tuning unit includes one of a photoswitch, an electrooptical modulator and an acousto-optic modulator; and the power tuning unit is constructed and arranged to periodically modulate intracavity loss and perform power tuning and Q-switched pulse outputting.

3. The degassing-free underwater dissolved carbon dioxide detection device according to claim 1, wherein the thulium-doped fiber vertical-cavity laser device light source system is formed by connecting a high-reflection (HR) grating, a power tuning unit, a first pump laser device, a first wavelength division multiplexer, a thulium-doped fiber, a second wavelength division multiplexer, a second pump laser device, a low-reflection (LR) grating in sequence;
    the HR grating and the LR grating form a resonator cavity of the thulium-doped fiber vertical-cavity laser device light source system; the resonator cavity outputs laser from one end of the LR grating;
    the first pump laser device, the second pump laser device, the first wavelength division multiplexer, and the second wavelength division multiplexer are constructed and arranged to perform bidirectional pumping on the thulium-doped fiber.

4. The degassing-free underwater dissolved carbon dioxide detection device according to claim 3, wherein the thulium-doped fiber is constructed and arranged to increase output power of laser with a wavelength of 2004 nm.

5. The degassing-free underwater dissolved carbon dioxide detection device according to claim 3, wherein the first pump laser device and the second pump laser device are constructed and arranged to perform unidirectional pumping on the thulium-doped fiber;
the first wavelength division multiplexer and the second wavelength division multiplexer are constructed and arranged to perform the unidirectional pumping on the thulium-doped fiber.

6. The degassing-free underwater dissolved carbon dioxide detection device according to claim 3, wherein the photoacoustic cell system is provided with a filter, a pressure relief valve, a flow valve, a water inlet, a microphone, a water outlet, a focusing lens, and a pressurized draining pump in sequence;
the filter, the pressure relief valve, and the flow valve are respectively constructed and arranged to realize filtering, pressure relief, and flow stabilization for sea water.

7. The degassing-free underwater dissolved carbon dioxide detection device according to claim 6, wherein the microphone is fixedly connected with the inner wall of the photoacoustic cell system and is kept in an orthogonality relation with the focusing lens to collect and convert a sound wave signal;
wherein an outer wall of the photoacoustic cell system is wrapped with a sound absorption material to relieve interference of environmental noise.

8. The degassing-free underwater dissolved carbon dioxide detection device according to claim 6, wherein the fiber collimator is connected with the focusing lens and is constructed and arranged to collimate and focus incident light; and
the phase-locked amplifier is constructed and arranged to extract a weak signal from environmental noise.

9. A degassing-free underwater dissolved carbon dioxide detection method applied to the degassing-free underwater dissolved carbon dioxide detection device according to claim 6, wherein the degassing-free underwater dissolved carbon dioxide detection method comprises:
step I, the computer controlling the laser device driving control module to input a driving signal to the laser device of 2004 nm and driving the 2004 nm laser device to emit laser, and injecting the emitted laser serving as a seed source into a cavity of the thulium-doped fiber vertical-cavity laser device after the laser passes through the photo-isolator;
step II, the HR grating and the LR grating forming the resonator cavity of the thulium-doped fiber vertical-cavity laser device, and the computer inputting the driving signal to the power tuning unit to periodically tune intracavity loss to realize power turning and Q-switched pulse outputting;
step III, the first pump laser device and the second pump laser device performing bidirectional pumping on the thulium-doped fiber through the first wavelength division multiplexer and the second wavelength division multiplexer, and outputting laser from one end of the LR grating;
step IV, performing filtering, pressure relief, flow stabilization and volume fixing on sea water through the filter, the pressure relief valve and the flow valve in sequence, putting the sea water into a cell through a water inlet, and draining the sea water by the pressurized draining pump through a water outlet;
step V, the laser entering the photoacoustic cell system through the fiber collimator, converging the laser to one position through the focusing lens to stimulate the sea water to be measured, and carbon dioxide in the sea water absorbing light energy with a specific wavelength 2004 nm to generate a photoacoustic signal; and
step VI, the microphone generating a current signal after detecting a sound wave signal and sending the current signal to the pre-amplifier circuit for current-voltage conversion, transmitting an output voltage signal to the computer for calculation after the voltage signal passes through the phase-locked amplifier, and performing inversion to obtain a concentration value of dissolved carbon dioxide in the seawater to be measured.

10. The method according to claim 9, wherein the power tuning unit includes one of a photoswitch, an electrooptical modulator and an acousto-optic modulator; and the power tuning unit is used to periodically modulate intracavity loss and perform power tuning and Q-switched pulse outputting.

11. The method according to claim 9, wherein the thulium-doped fiber is constructed and arranged to increase output power of laser with a wavelength of 2004 nm.

12. The method according to claim 9, wherein the first pump laser device and the second pump laser device are constructed and arranged to perform unidirectional pumping on the thulium-doped fiber;
the first wavelength division multiplexer and the second wavelength division multiplexer are constructed and arranged to perform the unidirectional pumping on the thulium-doped fiber.

13. The method according to claim 9, wherein the microphone is fixedly connected with the inner wall of the photoacoustic cell system and is kept in an orthogonality relation with the focusing lens to collect and convert a sound wave signal;
wherein an outer wall of the photoacoustic cell system is wrapped with a sound absorption material to relieve interference of environmental noise.

14. The method according to claim 9, wherein the fiber collimator is connected with the focusing lens and is constructed and arranged to collimate and focus incident light; and
the phase-locked amplifier is constructed and arranged to extract a weak signal from environmental noise.

15. A non-transitory computer program medium stored on a computer-readable medium, wherein the computer program medium comprises a computer-readable program which, when executed on an electronic device, provides a user input interface to implement the degassing-free underwater dissolved carbon dioxide detection method according to claim 9.

16. The non-transitory computer program medium stored on a computer-readable medium according to claim 15, wherein the power tuning unit includes one of a photoswitch, an electrooptical modulator and an acousto-optic modulator; and the power tuning unit is constructed and arranged to periodically modulate intracavity loss and perform power tuning and Q-switched pulse outputting.

17. The non-transitory computer program medium stored on a computer-readable medium according to claim 15, wherein the thulium-doped fiber is constructed and arranged to increase output power of the laser device with a wavelength of 2004 nm.

* * * * *

UNITED STATES PATENT AND TRADEMARK OFFICE
CERTIFICATE OF CORRECTION

PATENT NO. : 11,949,208 B2
APPLICATION NO. : 17/522978
DATED : April 2, 2024
INVENTOR(S) : Wang et al.

It is certified that error appears in the above-identified patent and that said Letters Patent is hereby corrected as shown below:

On the Title Page

(73) Assignee currently reads:
Ocean University Of China, Shangdon (CN)
Should read:
Ocean University Of China, Shandong (CN)

Signed and Sealed this
Fourteenth Day of May, 2024

Katherine Kelly Vidal
*Director of the United States Patent and Trademark Office*